United States Patent [19]

Dwivedi et al.

[11] Patent Number: 4,998,578
[45] Date of Patent: * Mar. 12, 1991

[54] METHOD OF MAKING METAL MATRIX COMPOSITES

[75] Inventors: Ratnesh K. Dwivedi, Wilmington; Virgil Irick, Jr., Hockessin, both of Del.

[73] Assignee: Lanxide Technology Company, LP, Newark, Del.

[*] Notice: The portion of the term of this patent subsequent to Oct. 3, 2006 has been disclaimed.

[21] Appl. No.: 380,977

[22] Filed: Jul. 17, 1989

Related U.S. Application Data

[63] Continuation of Ser. No. 142,385, Jan. 11, 1988, Pat. No. 4,871,008.

[51] Int. Cl.⁵ ............................................. B22D 19/14
[52] U.S. Cl. ............................................. 164/6; 164/9; 164/97
[58] Field of Search ............... 164/6, 9, 34, 97, 100, 164/131, 108, 109, 110

[56] References Cited

U.S. PATENT DOCUMENTS 3,364,976  1/1968  Reding et al. ........................ 164/98
3,396,777  8/1968  Reding, Jr. ........................... 164/97
3,853,635  12/1974 Demendi ............................. 164/97

Primary Examiner—Kuang Y. Lin
Attorney, Agent, or Firm—Mark G. Mortenson; Michael K. Boyer

[57] ABSTRACT

An aluminum metal matrix composite comprises an aluminum metal matrix embedding a second filler, such as a ceramic second filler, and is formed by contacting, for example, a molten aluminum metal with a permeable mass of second filler within a ceramic impervious mold formed by growing a polycrystalline oxidation reaction product into a first filler. By hermetically sealing the second filler within the mold with a body of molten aluminum metal, the latter spontaneously infiltrates the mass of second filler at moderate temperatures, e.g. about 900° C., without need of any other infiltration expedients. The molten mass containing the infiltrated ceramic filler is solidified to provide the metal matrix composite which may be recovered from the mold. Optionally, the solidification is carried out under bonding conditions including maintaining the solidifying material in direct contact with the ceramic mold, to provide the metal matrix composite joined to the mold, or a part thereof, as a structural component.

8 Claims, 4 Drawing Sheets

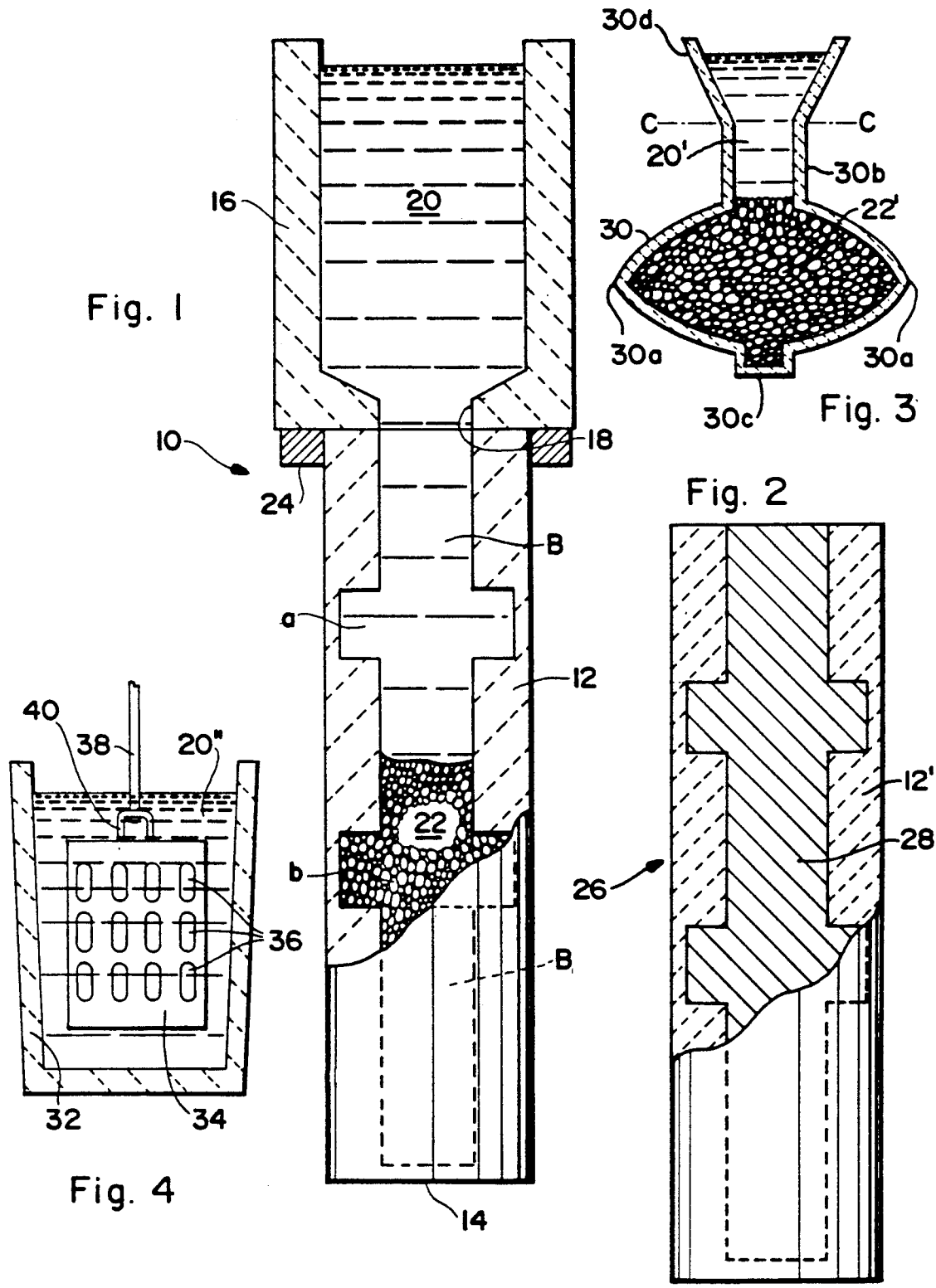

METHOD OF MAKING METAL MATRIX COMPOSITES

This is a continuation of co-pending application Ser. No. 142,385 filed on Jan. 11, 1988, which was allowed on Oct. 5, 1988 and now U.S. Pat. No. 4,871,008.

FIELD OF THE INVENTION

The present invention relates to a method of molding in a ceramic preform a metal matrix composite by the spontaneous infiltration of a permeable mass of filler, emplaced in the preform, with molten aluminum or magnesium or alloys thereof. The invention also relates to aluminum and magnesium metal matrix composite bodies and structures.

BACKGROUND AND DISCUSSION OF RELATED ART

Several composite products comprising a metal matrix embedding a strengthening or reinforcing phase comprising a filler such as ceramic particulates, whiskers, fibers or the like, show great promise for a variety of applications because they combine the strength and hardness of the strengthening phase with the ductility and toughness of the metal matrix. Generally, a metal matrix composite body will show an improvement in such properties as strength, stiffness, contact wear resistance, and strength retention at elevated temperatures relative to the matrix metal, per se. In some instances, the composite bodies may be lighter in weight than correspondingly sized bodies of the matrix metal per se. However, the degree to which any given property may be improved depends largely on the specific constituents used, their respective volumes or weight fractions in the composite bodies and how they are processed in forming the composite bodies. Aluminum matrix composites reinforced with ceramic fillers such as silicon carbide in particulate, platelet or whisker form, for example, are of interest because of their higher stiffness, and greater wear and temperature resistance relative to unfilled aluminum.

Various metallurgical processes have been described for the fabrication of aluminum matrix composites, including methods based on powder metallurgy techniques and those based on molten metal infiltration of reinforcing materials, such as by pressure casting.

With powder metallurgy techniques, the metal in the form of a powder and the ceramic reinforcing material in the form of a powder, whiskers, chopped fibers, etc., are admixed and then either cold-pressed and sintered, or hot-pressed. The production of metal matrix composites by powder metallurgy utilizing conventional processes imposes certain limitations with respect to the characteristics of the products attainable. The volume fraction of the ceramic phase in the composite is limited, typically to about 40%, the pressing operation poses a limit on the practical size attainable, and only relatively simple product shapes are possible without subsequent processing (e.g., forming or machining) or without resorting to complex presses. Also, nonuniform shrinkage during sintering can occur, as well as nonuniformity of microstructure due to segregation in the compacts and grain growth.

When molten aluminum is employed in the fabrication of, for example, aluminum matrix-alumina filled composites, the molten aluminum does not readily wet alumina reinforcing materials, thereby making it difficult to form a coherent product. The prior art suggests various solutions to this problem including coating the alumina (or other filler materials) with a wetting agent, applying pressure to force the molten aluminum into the reinforcing material or filler, applying a vacuum to draw the molten aluminum into the filler, operating at very high temperatures, well above the melting point of aluminum, and a combination of these techniques. These techniques tend to complicate the processing, require expensive equipment such as presses, vacuum apparatus, controls, etc., limit the sizes and shapes of products which can be formed, and sometimes introduce undesirable components into the product in the form of wetting agents or the like.

The use of a reactive atmosphere entrapped in a mold to facilitate the infiltration of molten metal is disclosed by U.S. Pat. No. 3,364,976 to J. N. Reding, et al. This patent discloses a method of casting metals such as aluminum and magnesium alloys in which a mold cavity, optionally containing a suitable filler, contains an atmosphere which is reactive with the molten metal to be cast and forms a low volume, solid reaction product. The mold is effectively sealed so that the reaction with the molten metal consumes the entrapped atmosphere and generates a vacuum within the mold cavity, thereby drawing in the molten metal. For example, at col. 3, line 55 et seq., there is described the reaction of molten magnesium with the oxygen and nitrogen content of the air to form magnesium oxide and magnesium nitride, thereby generating a vacuum sufficient to substantially completely fill the mold with molten magnesium. The drawings illustrate a box-like mold 10 having a single opening 12 leading to a cavity 14 containing an atmosphere which is appropriately reactive with molten metal 16. Immersion of the mold into a body of the molten metal, as illustrated in FIG. 3, is stated to obviate the necessity for the mold to be entirely gas or liquid tight (col. 2, lines 57–61) and reaction of the atmosphere entrapped within the mold causes the molten metal to fill the mold. Examples 5 and 10, respectively, illustrate infiltration of an alumina grain with molten magnesium alloy at 1300° F. (704° C.) and infiltration of a silicon carbide with molten aluminum alloy containing 5% magnesium at 1400° F. (760° C.).

U.S. patent application Ser. No. 049,171, filed May 13, 1987, which issued on May 9, 1989, as U.S. Pat. No. 4,828,008, in the name of Danny R. White, et al. and entitled "Metal Matrix Composites", assigned to the assignee of this application, discloses a method for producing aluminum matrix composites. According to this method, molten aluminum containing at least about 1 weight percent magnesium, and preferably at least about 3 weight percent magnesium, is contacted with a permeable mass of ceramic filler in the presence of a gas comprising from about 10 to 100 volume percent nitrogen, balance nonoxidizing gas, e.g. argon or hydrogen. The molten aluminum alloy, which may be at a temperature of about 700° C. to 1200° C., spontaneously infiltrates the permeable filler, i.e. infiltrates the filler without the necessity of applying mechanical pressure or vacuum to aid the infiltration. The molten body is allowed to solidify to form a metal matrix body embedding the ceramic filler, i.e. a metal matrix composite body. The ceramic fillers include, for example, oxides, carbides, borides and nitrides, e.g. alumina.

SUMMARY OF THE INVENTION

Generally, the present invention provides a method of forming metal matrix composites by spontaneous infiltration of molten aluminum or magnesium into a mass or bedding of a filler (below referred to as a "second filler") disposed in a mold, which is maintained in a substantially hermetic environment. The mold is formed by the directed oxidation of a molten precursor metal or parent metal with an oxidant to develop or grow a polycrystalline oxidation reaction product which embeds at least a portion of a preform comprised of a suitable filler (below referred to as a "first filler"). The hermetically sealed bedding may contain entrapped air, but the entrapped air and the mold contents are isolated or sealed so as to exclude or shut-out the external or ambient air. The mold is plenished with second filler and contacted with molten metal, and the mold contents are hermetically sealed, most typically by sealing the entry or opening of the mold. By providing a hermetic environment, effective spontaneous infiltration of the second filler at moderate molten metal temperatures is achieved, and therefore obviates or eliminates any necessity for wetting agents, special alloying ingredients in the molten aluminum metal or magnesium metal, applied mechanical pressure, applied vacuum, special gas atmospheres or any other infiltration expedient.

Accordingly, there is first formed a substantially impervious mold by the directed oxidation method described in the commonly owned patent applications and patents set forth below. A permeable preform comprised of a first filler and provided with a cavity of a desired configuration is contacted with a molten parent metal and reacted with an oxidant. This reaction forms an impervious oxidation reaction product and is carried out within a temperature range extending from a temperature above the melting point of the parent metal to a temperature below the melting point of the oxidation reaction product. During the reaction, at least a portion of the oxidation reaction product is maintained in contact with and extending between the molten parent metal and the oxidant to progressively draw molten parent metal through the oxidation reaction product towards the oxidant and into the preform, so that the oxidation reaction product continues to form within the preform at the interface between the oxidant and previously formed oxidation reaction product. The oxidation reaction is continued within the aforesaid temperature range to embed within the oxidation reaction product by growth of the latter at least a portion of the preform, thereby providing the impervious mold as a ceramic body having the first filler embedded therein. For example, at least that portion of the preform which defines the cavity may be embedded within the oxidation reaction product. In any case, the formed cavity of the impervious mold is filled at least partially with a permeable mass of a second filler, and then is contacted with molten aluminum for a period of time sufficient to infiltrate spontaneously the mass of second filler while maintaining this set-up in a hermetic environment. Upon completion of the spontaneous infiltration, the molten metal is solidified to provide the metal matrix composite body.

In one aspect of the invention, a standing body or reservoir of molten aluminum or magnesium extending beyond the mold cavity is used to effectuate the hermetic environment for the mold contents. Typically, the cavity opening or entry is sealed by a standing body or head of molten aluminum.

In accordance with another embodiment of the invention, the metal matrix composite body is bonded to the mold after solidification of the molten metal. Under the process conditions, the solidifying molten metal is maintained in contact with the impervious mold, or a portion thereof, in order to bond the resultant metal matrix composite to at least a portion of the mold. In this manner, the metal matrix composite is formed integrally with the mold, or a portion thereof, to form a metal matrix composite-ceramic laminate or structure.

In yet another embodiment, the cavity of the mold is preshaped to have a predetermined geometry, and the resulting metal matrix composite conforms with this geometry. When the mold is separated from the metal matrix composite, the surfaces of the metal matrix composite inversely replicate the geometry of the cavity. It thus is possible by this invention to make shaped metal matrix composite bodies.

DEFINITIONS

As used herein and in the claims, the following terms have the indicated meanings.

The terms "aluminum" and "magnesium" mean and include essentially pure metal, e.g. a relatively pure, commercially available unalloyed aluminum or magnesium, as well as other grades of metal and metal alloys such as the commercially available metals having impurities and/or alloying constituents such as iron, silicon, copper, magnesium, manganese, chromium, zinc, etc., therein. An aluminum alloy or magnesium alloy for purposes of this definition is an alloy in which aluminum or magnesium, respectively, is the major constituent.

The term "parent metal" means that metal, e.g. aluminum, silicon, titanium, tin or zirconium, which is the precursor of a polycrystalline oxidation reaction product and includes that metal as an essentially pure metal, or a commercially available metal having impurities and/or alloying constituents therein. A metal alloy for purposes of the definition is an alloy in which that precursor metal is the major constituent.

The term "ceramic" means and includes, but is not limited to, the classical definition of that term as being a material that consists entirely of non-metallic and inorganic materials, but also includes within its meaning a material which is predominantly ceramic with respect to either composition or dominant properties, although the body may contain substantial amounts of one or more metals derived from the parent metal, most typically within a range of from about 1–40% by volume, but may include still more metal.

The term "filler" means and includes any fillers suitable for use in the practice of the present invention including ceramic fillers per se, such as alumina or silicon carbide as fibers, chopped fibers, particulates, whiskers, bubbles, spheres, fiber matts, or the like, and ceramic-coated fillers such as carbon fibers coated with alumina or silicon carbide to protect the carbon from attack by molten aluminum metal.

The term "first filler" means at least one filler material which is suitable for embedment within a polycrystalline oxidation reaction product obtained by the directed oxidation of a parent metal, as described in greater detail below.

The term "second filler" means at least one filler material which is suitable for infiltration by molten aluminum or magnesium metal for embedment in a matrix of the solidified metal.

The term "impervious", as used to describe a mold or other material, structure or environment, means substantially impermeable to air, i.e., substantially air-tight.

BRIEF DESCRIPTION OF THE DRAWINGS

FIG. 1 is a schematic cross-sectional view of an assembly of a molten aluminum body and an impervious mold within which a mass of second filler is shown in an intermediate stage of being spontaneously infiltrated by the molten aluminum metal in accordance with one embodiment of the present invention.

FIG. 2 is a view corresponding to FIG. 1 showing a structure in accordance with one embodiment of the present invention comprising a metal matrix composite encased by and joined to a ceramic sleeve or substrate.

FIG. 3 is a cross-sectional view showing another embodiment of an assembly of a molten aluminum metal body and an impervious ceramic mold or shell having a second filler therein.

FIG. 4 is a cross-sectional, schematic view in elevation of an assembly for carrying out another embodiment of the invention by submerging a mass of second filler within molten aluminum to isolate the filler from ambient air.

DETAILED DESCRIPTION OF THE PREFERRED EMBODIMENTS

Figures 5, 5A:
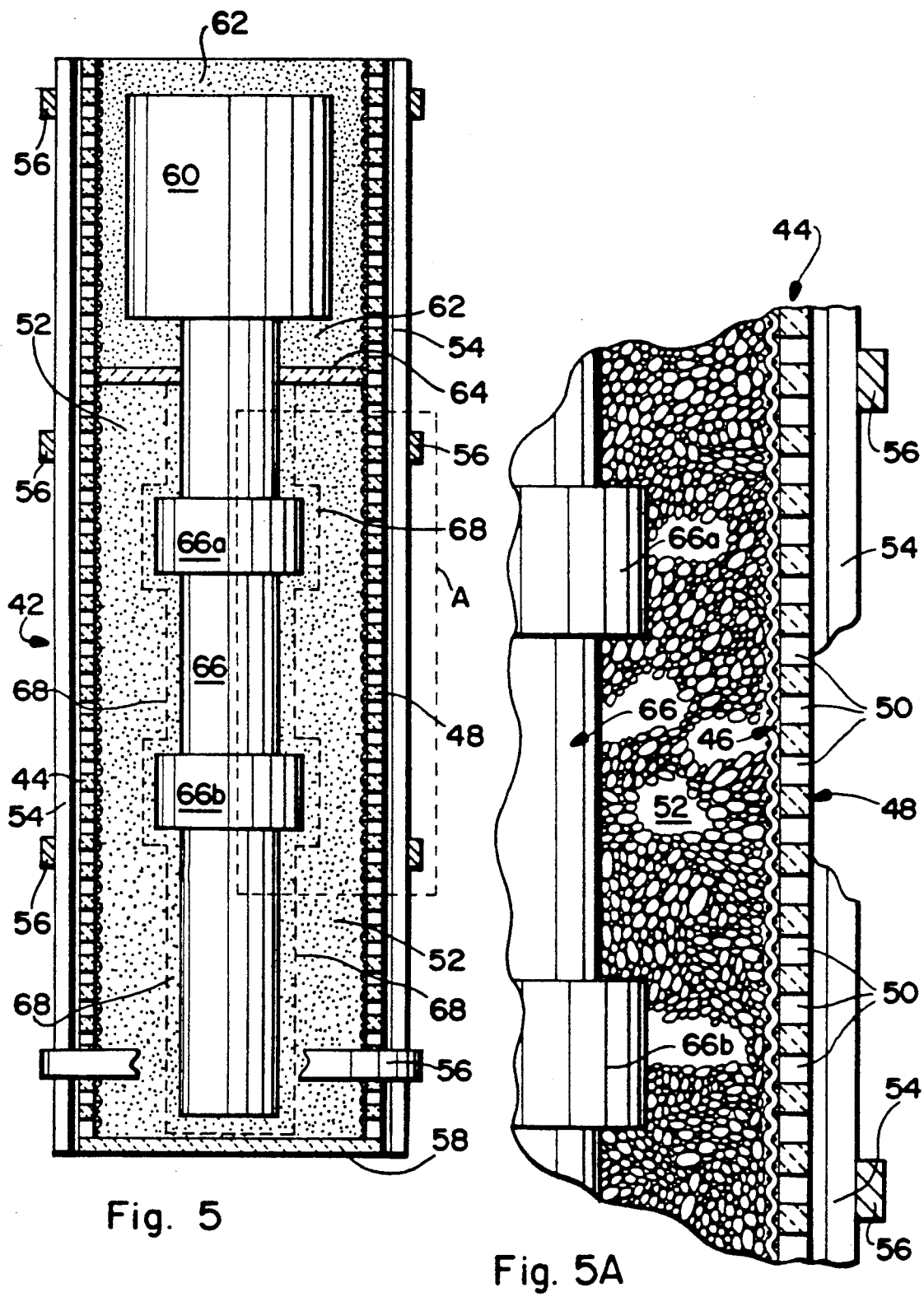
FIG. 5 and FIG. 5A are a schematic cross-sectional view in elevation of an assembly of a parent metal and preform for making a mold usable in casting a metal matrix composite in accordance with certain embodiments of the present invention.

In accordance with the practice of one embodiment of the present invention, molten aluminum or magnesium is contacted with or delivered to a surface of a permeable mass of a second filler, for example, a mass of ceramic particles, whiskers or fibers. The second filler is contacted with the molten metal in a hermetic environment in which air may be entrapped, but because the mold is substantially impervious, the entrapped air is not replenished as it reacts with or is otherwise consumed by the molten aluminum or magnesium (while air is specifically referred to herein throughout, it is to be understood that any gases which are reactive with at least one component in the molten metal could be utilized as the entrapped gaseous medium). Under these conditions, the molten aluminum or magnesium spontaneously and progressively infiltrates the permeable second filler mass within the mold, resulting in the formation of a metal matrix composite product in which the metal matrix embeds the second filler. The metal matrix composite will assume the shape of the mold, and may comprise from about 10 volume percent to about 45 volume percent of second filler, preferably from about 45 volume percent to about 65 volume percent of second filler.

Under the conditions employed in the method of the present invention, typically when the second filler is added to the mold, air is entrapped and pervades the mass or bedding. Also, this mass of filler is sufficiently permeable to permit infiltration of molten aluminum or magnesium under the process conditions. If, however, air within the mold is not replenished, the second filler, even though normally not wettable by molten aluminum in the presence of air, is spontaneously infiltrated by the molten aluminum or magnesium to form an aluminum metal matrix composite or magnesium metal matrix composite at moderate molten metal temperatures. Infiltration occurs without a need to resort to high temperatures, applied vacuum, mechanical pressure, special gas atmospheres, wetting agents, or the like, to effect infiltration. Generally, the process is impervious to external air by hermetically sealing the mold contents within an impervious mold and sealing all openings to the mold, or by immersing the mold containing the mass of second filler within a body of molten aluminum or magnesium to protect or shield the second filler from the ambient air.

The extent of spontaneous infiltration and formation of the metal matrix will vary with a given set of process conditions, such as the alloying constituents and content of the aluminum or magnesium; the presence of optionally employable wetting agents; the size, surface condition and type of second filler material used; the time of infiltration contact treatment; and the metal temperature employed. The temperature at which the contacting molten aluminum or magnesium is maintained may vary with different metal alloys and with different second fillers. In general, in the case of a molten aluminum metal, spontaneous and progressive infiltration will occur at a process temperature of at least about 700° C., and preferably of at least about 800° C. or more, depending on conditions. Temperatures in excess of 1000° C. are generally not necessary and a particularly useful temperature range has been found to be from about 800° C. to about 1000° C., preferably from about 850° C. to about 950° C.

The method of the present invention, not being dependent on the use of externally applied mechanical pressure to force molten metal into a mass of ceramic material, allows for the production of substantially uniform aluminum metal matrix composites or magnesium metal matrix composites having a high volume fraction of second filler, and being of low porosity. The volume fraction of a second filler for a set of conditions may be altered or increased by using a mass of second filler having low porosity, that is, low interstitial volume. Higher volume fractions of second filler also may be achieved if the mass of second filler is compacted by conventional techniques prior to being contacted with the molten metal, provided that the mass of second filler is not converted into either a compact mass with closed cell porosity or into a structure that is so dense as to prevent infiltration by the molten aluminum or magnesium.

It has been observed that for aluminum or magnesium infiltration and matrix formation with a given metal-second filler system, wetting of the second filler by the molten metal, or creation of a vacuum in a closed environment by reacting the molten metal with either Oxygen or Nitrogen from the closed environment, or some combination of these two mechanisms, are the predominant infiltration mechanisms. If air is replenished to the system and if the process is conducted at relatively low temperatures, i.e. not more than about 1000° C., a negligible or minimal amount of wetting and infiltration of the second filler occurs. However, in the case of a molten aluminum metal, by sealing the second filler within the mold so that the air is not replenished, i.e. by hermetically sealing the infiltration process, spontaneous infiltration is obtained at temperatures which do not exceed about 1000° C., and preferably not exceed about 950° C. For example, a temperature of about 900° C. has been found to be satisfactory in many cases as providing a temperature high enough to carry out spontaneous infiltration within an acceptable period of time without unduly degrading the second filler or attacking refractory vessels, structural components and the like.

Referring now to FIG. 1, there is shown an assembly indicated generally as 10 of an impervious enclosure or mold 12 which is of a generally cylindrical, sleeve-like configuration, having a central cylindrical bore B extending therethrough and having formed therein a pair of longitudinally spaced apart, disc-shaped chambers "a" and "b" formed therein of a diameter greater than that of bore B. The bottom portion of bore B (as viewed in FIG. 1) is closed by a floor 14 of the mold 12 as indicated by the dashed line rendition of the profile of bore B in FIG. 1. The walls (unnumbered) of impervious mold 12 are comprised of a ceramic material produced by utilizing one or more of the techniques of certain commonly owned patent applications and patents which are described below. Accordingly, impervious mold 12 comprises a ceramic polycrystalline oxidation reaction product embedding a suitable filler, referred to herein as a first filler, such as alumina, silicon carbide or any other suitable ceramic filler, or combinations thereof. The first filler may be in any desired form such as particulates, spheres, whiskers, chopped fibers, bubbles, pellets, fiber matts, etc., or any combination thereof.

The bore B and enlarged diameter chambers "a" and "b" are filled with a suitable second filler 22 which, like the first filler, may comprise any desired suitable filler and may be in the physical form of particulates, spheres, whiskers, fibers, chopped fibers, bubbles, pellets, fiber matts, etc., or any combination thereof. The emplacement of second filler within bore B of mold 12 may be carried out without the provision of a special gas atmosphere, that is, such filling may be carried out in air so that air will be entrained within the second filler and contained within bore B of impervious mold 12.

A refractory reservoir 16 having a circular opening 18 formed in the base or floor thereof is disposed atop mold 12 in the manner illustrated in FIG. 1, in which a seal ring 24 provides a substantially air-tight (i.e., at least metal-tight) seal between reservoir 16 and mold 12. Reservoir 16 surmounting mold 12 is then filled with molten aluminum or, if desired, a body of solid aluminum may be placed within reservoir container 16 and the assembly heated to melt the aluminum metal within container 16. Although the invention is described with particular reference to aluminum, it should be understood that magnesium is also applicable. In either case, a body of molten aluminum metal 20 seals the sole opening or entry to the impervious mold 12 against the ambient air so that the second filler 22 is effectively hermetically sealed from the ambient air and the molten metal is in contact with second filler 22 at the top surface thereof within bore B. Under these conditions, in accordance with the present invention, the molten aluminum will spontaneously infiltrate second filler 22, advancing downwardly therethrough. The assembly 10 may be maintained in a normal air atmosphere during processing, without adverse effects on the spontaneous infiltration.

FIG. 1 shows an intermediate stage of the spontaneous infiltration wherein the molten aluminum 20 has infiltrated about half of the bed of second filler 22 to a point approximately halfway between chambers "a" and "b". After a period of time, with the temperature maintained high enough to maintain the aluminum 20 in the molten condition, e.g. about 900° C., the aluminum will spontaneously infiltrate the entire bed of second filler 22, to the floor 14 of the mold 12. This spontaneous infiltration takes place without the necessity of supplying wetting agents to the filler (although such may optionally be used), of applying mechanical pressure to metal 20 or a vacuum to bedding of second filler 22, of operating at elevated temperatures such as temperatures substantially in excess of 1000° C., of purging the bed of second filler 22 with an inert or other special gas atmosphere, or of using other infiltration expedients. The method of the present invention is highly advantageous in that the entire operation, including the preparation of mold 12 (as described below), the filling of mold 12 with second filler 22, and the heating to carry out the infiltration may be carried out in air without resort to employing specialized gas atmospheres with their attendant costs and inconveniences.

Without wishing to be bound thereby, it is believed that spontaneous infiltration of the second filler 22 by the molten aluminum is attained because air entrapped in the interstices of the bed of second filler 22 reacts with and is consumed by the molten aluminum, and replenishment of the entrained or entrapped air is precluded by the sealed, impervious mold 12. However, if the consumed air were replenished, as would occur if mold 12 were pervious to air, either due to inherent porosity, or to unsealed openings or cracks or fissures formed therein, the replenished air would prevent such spontaneous infiltration. The comparative examples given below appear to support this explanation.

After infiltration of second filler 22 has been completed, the temperature is reduced as by removing the assembly from the furnace or shutting off the furnace, and the molten material is allowed to cool and solidify within the impervious mold 12. The resulting composite structure 26 comprising the mold and metal matrix composite core, illustrated in FIG. 2, is then separated from the assembly of FIG. 1. As illustrated, structure 26 may include substantially all of mold 12 (designated as structural member or mold or shell component 12' in FIG. 2), or where desired only a portion thereof, and further includes the metal matrix composite core 28.

The molten metal infiltration and solidification may be carried out under suitable conditions to effect bonding between the mold and core. Bonding may be achieved, for example, by obtaining some wetting between the molten metal and the mold 12, by keeping the molten material in direct contact with the interior walls of mold 12 by controlling the rate of cooling (i.e., stress relief due to annealing), by adjusting the relative coefficients of thermal expansion of mold 12 and the metal matrix composite, and/or by maintaining a substantial head of metal reservoir to substantially eliminate or reduce separation of the solidifying molten material from mold walls. The coefficient of thermal expansion for the metal matrix composite is greater than that for the ceramic mold, and if this difference is too large and wetting is minimal, the bond strength is not sufficient to survive the thermal contraction mismatch. That is, the metal matrix composite on cooling may shrink away from the interior wall of the mold. The second filler material used in forming the metal matrix composite decreases the thermal expansion of the metal matrix composite, and therefore decreases the mismatch in thermal expansion between the core and mold. The effect the filler has on lowering thermal expansion can depend largely on type, geometry and aspect ratio of the filler. A good bond may be accomplished when the coefficients of thermal expansion are not too different from each other. Preferably, the metal matrix core has a somewhat higher expansion coefficient than the shell to induce compressive stresses on the shell. It has been found that substantially equiaxed silicon carbide particles (24 mesh) at about 47 volume percent loading in aluminum reduces the coefficient of thermal expansion from that of pure aluminum (about $25 \times 10^{-6}$ inch/inch/°C.) to about $12-16 \times 10^{-6}$ inch/inch/°C. Silicon carbide whiskers have the same effect but at much lower loadings. Thus, by controlling one or more conditions, the solidified molten material, i.e. the metal matrix composite, is bonded to structural member 12' of the structure 26 (FIG. 2). In structure 26, the core comprised of the metal matrix composite 28 is encased by and bonded to the mold or shell component 12'.

Alternatively, after cooling and solidification of the molten material, the mold 12' may be fractured or otherwise removed from the metal matrix composite core 28 to provide the latter as a separate body unencumbered by mold 12'. In this case, mold 12' typically is made as thin as possible consistent with enabling it to be impervious and maintain structural integrity during processing. Also in this case, the process should be carried out under conditions to minimize bonding between the mold 12' and metal matrix composite core 28 to facilitate recovery of the core. A suitable encasement (not shown in FIG. 1) may be emplaced around mold 12 during filling and processing in order to mechanically reinforce and support it.

Referring again to FIG. 1, in lieu of providing suitable sealing means such as a sealing ring 24, reservoir chamber 16 may be formed integrally with impervious mold 12 as by utilizing one or more of the techniques described in the commonly owned patent applications and patents. After cooling and solidification of the molten material, the desired product may be cut from the integral mold/reservoir. For example, an integral mold/reservoir is shown in FIG. 3, which illustrates another embodiment of an assembly utilizable in accordance with the present invention. A hollow body indicated generally as 30, of any desired configuration, comprises a shell of impervious ceramic material such as a composite ceramic material made by the techniques of the commonly owned patent applications and patents discussed later herein. Moreover, it is possible to form a shell of impervious ceramic material by the methods disclosed in copending and commonly owned U.S. patent application, Ser. No. 908,119, filed Sept. 16, 1986 now allowed, in the name of Ratnesh K. Dwivedi and entitled "Porous Ceramic Composite with Dense Surface", the subject matter of which is herein incorporated by reference. Hollow body 30, somewhat pillow-shaped in cross-section, has a circular peripheral rim 30a about its main body portion, and a coaxially aligned cylindrical shaft 30b and hub 30c extending from opposite sides thereof. Shaft 30b has an outwardly flared mouth 30d which provides a funnel-shaped structure within which molten aluminum 20' may be emplaced atop and in contact with a bed 22' of second filler. Mouth 30d provides the sole opening of hollow body 30 and is sealed from the ambient atmosphere or air by the standing head of molten aluminum 20', thereby effectively hermetically sealing second filler 22' from ambient or external air.

Spontaneous infiltration of second filler 22' is accomplished as described with respect to the embodiment of FIG. 1 and, like the FIG. 1 embodiment, the reservoir of molten metal 20' may be replenished as required to provide sufficient aluminum metal to complete the infiltration and to maintain a standing body 20' of molten aluminum to keep mouth 30d, the sole entry or opening of hollow body 30, sealed against the ambient air until completion of the spontaneous infiltration. Upon solidification under bonding conditions of the molten material obtained by infiltration of second filler 22', a structure is provided comprising hollow body 30 as a structural component encasing a metal matrix composite. Alternatively, hollow body 30 may be removed, as by fracturing it, to provide a metal matrix composite body whose outer surface inversely replicates the shape or geometry of the inner surface of hollow body 30. After solidification, the resulting structure may be cut along the line C—C to provide a structure terminating with shaft 30b. Re-solidified aluminum may be left within shaft 30b or, alternatively, the resolidified aluminum within shaft 30b may be partly or entirely removed and replaced with another material, such as another metal which may be introduced in molten form and allowed to solidify therein. As another alternative, shaft 30b could have been partly or entirely initially filled with second filler 22' so that the resultant metal matrix composite body extends through shaft 30b. In the latter case, an extension of shaft 30b or a separate reservoir vessel (like reservoir 16 of the FIG. 1 embodiment) is employed to hold the molten aluminum metal.

FIG. 4 shows an alternate technique for conducting the spontaneous infiltration of a second filler wherein a refractory vessel 32 contains a body of molten aluminum 20" within which a refractory perforated container 34 is submerged. Container 34 is spaced from the interior walls (unnumbered) of refractory vessel 32 so that perforated container 34 and its contents are entirely shielded or sealed by molten aluminum metal 20" from the ambient atmosphere. Perforated container 34 has a plurality of perforations 36 formed therein and is supported by a cable or rod 38 fixed thereto by a suitable connector 40. A mass of second filler contained within a suitable mold having one or more openings therein is contained within container 34. (The mold and second filler are not visible in FIG. 4.) The perforations 36 provide for entry of the molten aluminum 33 into container 34 for contact therein with the mass of second filler and consequent spontaneous infiltration. Perforated container 34, cable or rod 38 and connector 40 may be made of a suitable refractory material capable of resisting prolonged contact with the molten aluminum 33. Where desired, the container 34 may be eliminated, and the mold, having an opening at the top and containing second filler, is submerged or immersed into the molten metal. Infiltration then proceeds, and the metal matrix composite body is recovered, as described above.

FIGS. 5 through 9 illustrate the preparation of an impervious ceramic mold in accordance with the practice of the present invention, but it should be understood that the method for the preparation of the mold is applicable to other embodiments of this invention. The mold so provided, as mentioned above, either may be fractured for recovery therefrom of the solidified metal matrix composite, or may be retained as a structural component of the product joined or bonded to the metal matrix composite.

COMMONLY OWNED PATENT APPLICATIONS AND PATENTS

Techniques for the production of such ceramic materials discussed above are disclosed in a number of commonly owned patent applications and patents, assigned to the assignee of this application, which disclose novel methods for producing self-supporting ceramic materials, including self-supporting ceramic composite materials in which the ceramic embeds a suitable first filler.

The method of growing a ceramic oxidation product is disclosed generically in commonly owned U.S. Pat. No. 4,713,360 (which corresponds to published European Patent Application No. 0155831, published Sept. 25, 1985), in the name of Marc S. Newkirk, et al. and entitled "Novel Ceramic Materials and Methods of Making the Same". This discovery of an oxidation phenomenon, which may be enhanced by the use of a dopant alloyed in the parent metal, affords self-supporting ceramic bodies grown as the oxidation reaction product of the precursor parent metal.

A further development provides a novel method for producing a self-supporting ceramic composite by growing the oxidation reaction product from a parent metal into a permeable bedding of filler, as described in Commonly Owned U.S. patent application Ser. No. 819,397, filed Jan. 17, 1986 which issued on July 25, 1989, as U.S. Pat. No. 4,851,375 (which corresponds to published European Patent Application No. 0193292, published Sept. 3, 1986) as a continuation-in-part of Ser. No. 697,878, filed Feb. 4, 1985 (now abandoned), both in the name of Marc S. Newkirk, et al. and entitled "Composite Ceramic Articles and Methods of Making Same".

The foregoing methods were improved upon by the use of external dopants applied to the surface of the precursor parent metal as disclosed in Commonly Owned U.S. patent applications Ser. No. 220,935, filed June 23, 1988, which issued on Aug. 1, 1989, as U.S. Pat. No. 4,853,352, that is a continuation of Ser. No. 822,999, filed Jan. 27, 1986 (which corresponds to published European Patent Application No. 0169067, published Jan. 22, 1986), in the name of Marc S. Newkirk, et al. and entitled "Methods of Making Self-Supporting Ceramic Materials".

The technique of producing self-supporting ceramic composite materials embedding a filler as disclosed in the aforesaid application Ser. No. 819,397, which issued on July 25, 1989, as U.S. Pat. No. 4,851,375 is useful, but did not provide for imparting a preselected shape or geometry to the resulting ceramic composite body. However, this need was met by further developments of the foregoing methods which enable the formation of ceramic composite structures which inversely replicate the positive pattern of a precursor parent metal. These methods are described in Commonly Owned U.S. patent application Ser. No. 823,542 filed Jan. 27, 1986, which issued on May 9, 1989, as U.S. Pat. No. 4,828,785 (which corresponds to published European Patent Application No. 0234704, published Sept. 2, 1987), in the name of Marc S. Newkirk, et al., entitled "Inverse Shape Replication Method of Making Ceramic Composite Articles and Articles Obtained Thereby", and in Commonly Owned U.S. patent application Ser. No. 896,157, filed Aug. 13, 1986, which issued on Aug. 22, 1989, as U.S. Pat. No. 4,859,640 in the name of Marc S. Newkirk and entitled "Method of Making Ceramic Composite Articles with Shape Replicated Surfaces and Articles Obtained Thereby". Also, inverse shape replication by use of an expendable pattern body is described in Commonly Owned U.S. patent application Ser. No. 206,999, filed on June 13, 1988, which issued on Apr. 4, 1989, as U.S. Pat. No. 4,818,454, that is a continuation of Ser. No. 907,919, filed Sept. 16, 1986 in the name of Andrew W. Urquhart, et al., and entitled "Method of Making Ceramic Composite Articles by Inverse Shape Replication of an Expendable Pattern".

Other methods of making ceramic composite bodies or structures having a preselected shape or geometry were developed. These methods include the utilization of a shaped preform of permeable filler into which the ceramic matrix is grown by oxidation of a parent metal precursor, as described in commonly owned U.S. patent application Ser. No. 861,025, filed May 8, 1986 (which corresponds to published European Patent Application No. 0245192, published Nov. 11, 1987), in the name of Marc S. Newkirk, et al., and entitled "Shaped Ceramic Composites and Methods of Making the Same". Another method of making such shaped ceramic composites includes the utilization of a barrier means to arrest or inhibit the growth of the oxidation reaction product at a selected boundary to define the shape or geometry of the ceramic composite structure. This technique is described in commonly owned U.S. patent application Ser. No. 861,024, filed May 8, 1986, now allowed (which corresponds to published European Patent Application No. 0245193, published Nov. 11, 1987), in the name of Marc S. Newkirk, et al., and entitled "Method of Making Shaped Ceramic Composites with the Use of a Barrier".

The utilization of a reservoir of parent metal to facilitate the manufacture of ceramic composite bodies or structures, particularly shaped bodies or structures, was a still further development by providing a reservoir of the parent metal in flow communication with the body of parent metal as the precursor for the oxidation reaction. By replenishing the supply of parent metal, the technique enables the growth of large volumes of oxidation reaction product from sites capable of holding only limited quantities of parent metal. The reservoir feed technique is disclosed in Commonly Owned U.S. patent application Ser. No. 908,067, filed Sept. 16, 1986, now allowed in the name of Marc S. Newkirk, et al., and entitled "Reservoir Feed Method of Making Ceramic Composite Structures and Structures Made Thereby".

The entire disclosures of all of the foregoing commonly owned U.S. patent applications and patents are hereby expressly incorporated by reference.

In the present invention, the filler into which the oxidation reaction product is grown, in accordance with the techniques of one or more of the above-described commonly owned patent applications and patents, to provide the air-impermeable ceramic composite mold, is referred to as first filler to distinguish it from the second filler into which the molten aluminum or magnesium is spontaneously infiltrated to provide the metal matrix composite. Many materials are suitable for use as both first fillers and second fillers; accordingly, in a given case the first and second fillers may be the same or different, and typically the fillers are substantially non-reactive with molten parent metal and molten aluminum or magnesium under the process conditions.

Referring now to FIGS. 5 and 5A, there is shown an assembly 42 for making a ceramic composite body suitable for use either as a frangible mold from which the metal matrix composite is recovered, or as a mold/structural member bonded to the metal matrix composite. Assembly 42 includes a barrier means container 44 which is substantially cylindrical in configuration and has an interior surface defined by a screen 46 (as best seen in FIG. 5A) contained within and reinforced by a perforated cylinder 48 which serves as an outer, rigid member reinforcing the cylindrical screen 46. A perforated metal sheet, such as a perforated stainless steel sheet, may be substituted for the screen 46. Perforated cylinder 48 has formed throughout its surface a pattern of perforations 50 and is rigid enough to retain during processing the shape of a mass or body of a first filler 52, which may be a moldable filler, that is, which may comprise particles, whiskers, fibers or the like in a mass which will conform in shape to the shape of body 66 of parent metal embedded within the bed of first filler 52. Moldable first filler 52 also conforms to the shape of the interior of cylindrical screen 46. The bed of moldable first filler 52 thus comprises a permeable preform having a cavity of desired configurations formed therein by parent metal body 66, the cavity being filled at inception by the parent metal body. In an alternative embodiment, first filler 52 may be preformed into a coherent mass such as by conventional methods such as by slipcasting, or the like, by utilizing particles, fibers, powders, etc., which may include the addition of a suitable binder to provide green strength. In such a case, the parent metal may be introduced into the cavity of the preform in the molten state.

The openings (unnumbered) of screen 46 align with many of the perforations 50 in cylinder 48 so that the barrier means container 44 is open to entry therein of the surrounding atmosphere. A plurality of stainless steel angle braces 54 is positioned at spaced locations about the periphery of the outer surface of cylinder 48 and held in place by clamp rings 56 which serve to structurally reinforce assembly 42. The lowermost of clamp rings 56 is partially broken away in FIG. 5 and the remaining clamp rings 56 in FIG. 5 and those illustrated in FIG. 5A are shown in cross-section. A base 58 closes the bottom of barrier means container 44. A reservoir body 60 of parent metal is disposed within a bed 62 of inert material which is positioned within the upper portion of barrier means container 44 and is separated from the bed of first filler 52 by a plate 64. The bed 62 of inert material may comprise a bed of inert particulate material (such as #90 grit El Alundum (Norton Co.) when aluminum is the parent metal) which will not support growth of the polycrystalline oxidation reaction product therein under the process conditions.

Plate 64 has a central aperture (unnumbered) to admit passage therethrough of an upper section of a parent metal body 66 which is embedded within the bed of first filler 52. In the illustrated embodiment, parent metal body 66 has an elongated, cylindrical configuration and has a pair of disc-shaped protrusions 66a, 66b at longitudinally spaced-apart locations thereon. Parent metal body 66 thus extends as a core of parent metal within and in contact with the bed of first filler 52. One or more dopants, to facilitate the oxidation reaction of the parent metal, may be alloyed within parent metal body 66 and the reservoir body 60 of parent metal, and/or may be externally applied to parent metal body 66, and/or applied to or disposed within first filler 52, at least in the vicinity of parent metal body 66.

Upon heating the assembly 42 in the presence of an oxidant to within a temperature range extending from above the melting point of the parent metal to below the melting point of the oxidation reaction product to be formed therefrom, and maintaining the temperature within that range with the assembly 42 exposed to an oxidizing environment, such as air, oxidation reaction product will form at the interface between the molten parent metal body 66 and the bed of first filler 52. As described in one or more of the commonly owned patent applications and patents, the oxidant may be solid, liquid or gas, or a combination thereof. For example, air may be used in combination with a solid oxidant incorporated into the first filler (e.g. silica admixed with alumina filler) and molten parent metal will undergo oxidation upon contact with both oxidants. Molten parent metal from parent metal body 66, replenished as required from reservoir body 60 of parent metal, is maintained in contact with the growing oxidation reaction product, which is contacted by oxygen or another oxidant gas passing through perforations 50 in cylinder 48 and then through screen 46 and through the bed of first filler 52 into contact with the growing front of oxidation reaction product. The surrounding oxidizing atmosphere is replenished or replaced as by circulating air within a furnace within which assembly 42 is positioned, e.g. by simply providing the furnace with adequate ventilation for the entrance of air. As the oxidation reaction continues, oxidation reaction product continues to form within the bed of first filler 52 at the interface between the oxidant and previously formed oxidation reaction product, and the reaction is continued to embed at least a portion of the bed of first filler 52 within the oxidation reaction product.

If desired, the reaction may be terminated when the growing oxidation reaction product has grown to approximately the dimensions indicated by dashed line 68 in FIG. 5. Although dashed line 68 is drawn with more or less geometric precision in FIG. 5, it will be appreciated that if the oxidation reaction is stopped after a layer of suitable thickness of polycrystalline oxidation reaction product has been formed from parent metal body 66, the exterior shape of the ceramic member may be somewhat irregular, but this will not adversely affect use of the resultant ceramic member as an impervious mold for forming the metal matrix composite. As explained in the relevant commonly owned patent applications and patents, the interior of the grown ceramic will inversely replicate the shape of parent metal body 66. Alternatively, a barrier material comprising plaster of paris and calcium carbonate, or one constructed from a material such as the material of screen 46 can be configured to provide a hollow cavity substantially in the shape of dashed line 68 in order to stop or limit growth of the oxidation reaction product to provide a shell of ceramic material having the inverse of the shape of the interior surface of the barrier member to which it is grown. In this way, the geometric configuration of the outer surface of the resultant ceramic composite shell can be closely controlled, which makes the ceramic composite shell useful as a permanent structural component joined to the metal matrix composite body. In the FIG. 5 embodiment, the geometric configuration of the outer surface of the grown ceramic is controlled by the shape of the interior of screen 46.

If the ceramic composite shell is used simply as a mold from which the metal matrix composite body will be recovered, the shell normally is made only as thick as necessary for it to have sufficient structural strength and be impervious for use in the process. After solidification and cooling of the metal matrix composite body, the mold is fractured and separated or parted from the metal matrix composite body. For example, after the molten material has solidified but while the assembly is still at an elevated temperature below the melting point of the aluminum metal, for example, at a temperature of about 300°–500° C., the mold-encased metal matrix composite body may be quenched by immersing it into a coolant liquid such as water, so that the resultant thermal shock will fracture the thin shell mold encasing the metal matrix composite body. Alternatively, the mold may be fractured by mechanical means. The surfaces of the resulting metal matrix composite substantially inversely replicate the interior geometry of the mold. Moreover, it may be desirable to avoid bonding between the metal matrix composite body and the shell, to facilitate removal of the shell from the composite body.

When the ceramic composite shell or body, or a portion thereof, serves as a structural component of the end product, the shell is joined or bonded to the metal matrix composite. The ceramic structural component may be preshaped in the configuration needed for the desired end use. For example, in the embodiment illustrated in FIGS. 5 and 5A, the oxidation reaction may be continued to embed the entire bed of first filler 52 within the growing polycrystalline oxidation reaction product so that barrier means 44 serves to stop or inhibit growth of the oxidation reaction product, thereby defining the outer geometry of the end product as a circular cylinder. If the barrier means comprises a screen or perforated material, the exterior surface of the resulting ceramic cylinder will be rough or patterned. The outer surface of the cylinder may be machined, ground, polished, or the like. Alternatively, the barrier means 44 may have a relatively smooth surface thereby imparting a smooth exterior surface to the composite body. For example, a slurry of plaster of paris (preferably admixed with calcium carbonate or calcium silicate) can be applied to the boundary of bedding 52 and allowed to set. The plaster of paris layer prevents overgrowth of the polycrystalline oxidation reaction product, and after the process is completed, the barrier is easily removed as by grit blasting, scraping, or the like, thereby providing a composite with a relatively smooth surface. In any case, the ceramic shell is designed to provide structural utility and to provide a good bond with the metal matrix composite so as to form an integral structure.

If the parent metal body 66 is adequately replenished from reservoir body 60 during the oxidation reaction process, the interior of the resulting sleeve-shaped ceramic body will be filled with a core of parent metal. This parent metal may be removed while still molten by simply draining or decanting it from the resultant ceramic sleeve. If the core of molten parent metal is allowed to resolidify, or if any metal residue remains and solidifies, at least a desirable amount of the remaing metal may be removed from the resultant ceramic sleeve by machining and/or by acid etching, e.g. with a solution of hydrochloric acid in the case of an aluminum parent metal, leaving behind a ceramic sleeve having a hollow core which inversely replicates the shape of parent metal body 66. The hollow core then may be used as the mold cavity into which the second filler is emplaced and contacted with molten aluminum or magnesium to form the metal matrix composite.

Figure 6:
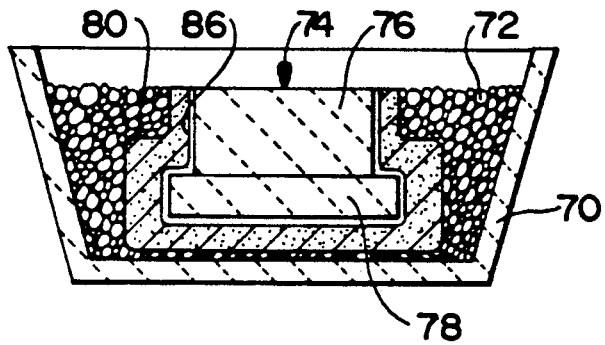
FIG. 6 is a schematic, cross-sectional view in elevation of an assembly of an expendable pattern body embedded within a mass of first filler which is usable to make a ceramic composite mold in accordance with another embodiment of the present invention.
Figure 8:
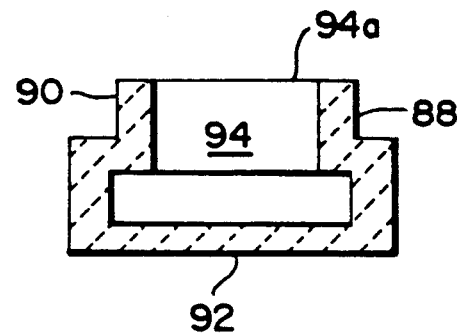
FIG. 8 is a schematic, cross-sectional view of the ceramic composite mold obtained by utilization of the assembly of FIGS. 6 and 7.
Figure 7:
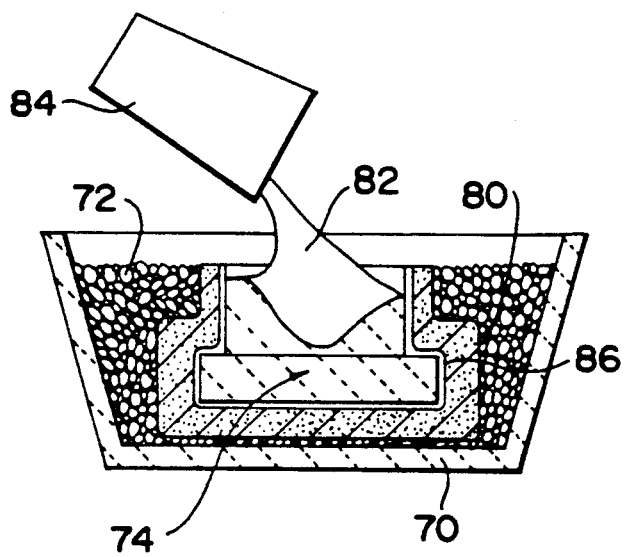
FIG. 7 is a view corresponding to FIG. 6 showing a later step in the process of using the assembly of FIG. 6 to make the ceramic composite mold.

FIGS. 6 to 8 schematically illustrate the preparation of an impervious ceramic composite mold prepared by a method which includes utilizing an expendable pattern body. FIG. 6 shows a refractory vessel 70, such as an alumina vessel, which contains a bed of conformable first filler 72 within which an expendable pattern body 74 is embedded to define within bed 72, at the interface between the first filler and the expendable pattern body 74, a shaped cavity wall of the bed 72. The geometry of the cavity wall is congruent to that of the outer surface of expendable pattern body 74, i.e. being the inverse replicate thereof. Expendable pattern body 74, which may be made of any suitable vaporizable or combustible material, such as a polystyrene foam or wax material, has a center section 76, which is generally cylindrical in configuration, and an end section 78 which is axially shorter but of greater diameter than the center section 76. A suitable barrier means 80 (not necessarily drawn to scale), which may comprise a stainless steel screen or perforated steel cylinder establishes the outer boundaries of the ceramic composite body to be prepared. Barrier means 80 alternatively may comprise a plaster of paris and calcium silicate member, which typically may be obtained by applying a slurry of the material to a substrate or web such as cardboard and allowing the slurry to set. In any case, the construction of barrier means 80 is such that it will inhibit growth of the oxidation reaction product and thereby define the boundary of the product.

As illustrated in FIG. 7, molten parent metal 82 may be poured from a suitable vessel 84 directly onto the embedded expendable pattern body 74. The molten parent metal vaporizes the polystyrene foam or other vaporizable material of the expendable pattern body 74 and the vaporized material exits the assembly either through the bed of first filler 72 or upwardly through the same area in which the molten parent metal is added, or through a separate venting port (not shown) which may be provided. After the molten parent metal replaces the entire expendable pattern body 74, the assembly is heated to or maintained at a growth temperature within a range above the melting point of the parent metal but below the melting point of the oxidation reaction product. The vapor phase oxidant permeates the permeable bed of filler 72 and contacts the molten metal for oxidation thereof to form a polycrystalline oxidation reaction product as described above, which grows through the preform and into contact with barrier material 80. Where desired, a solid oxidant or a liquid oxidant may be incorporated into bed 72, or that portion of the bed bounded by the barrier 80. The molten metal reacts with the oxidant in the bedding thereby developing oxidation reaction product. Also, two or more oxidants may be used in combination, such as by using a reactive silicate in the bed and conducting the process in air. If necessary, the molten parent metal 82 may be replenished to maintain its level at the top of the filler bed 72. As taught in commonly owned patent applications Ser. No. 823,542 (U.S. Pat. No. 4,828,785), and Ser. No. 907,919, referred to previously herein, to prevent the cavity wall from collapsing or deforming, the bed of filler 72, or at least a support zone 86 thereof enveloping expendable pattern body 74, is intrinsically self-bonding at or above a self-bonding temperature which preferably lies close to, but below, the oxidation reaction temperature. Thus, upon being heated to its self-bonding temperature, the first filler 72, or a support zone 86 thereof, sinters or otherwise bonds to itself and attaches to the growing oxidation reaction product sufficiently to provide adequate mechanical strength to the first filler surrounding the molten parent metal during the initial stages of oxidation reaction product growth. The mechanical strength of the self-bonding filler resists the pressure differential and maintains the structural integrity of the cavity until a sufficient thickness of the ceramic composite material is developed.

After the oxidation reaction product has grown to the boundary defined by barrier means 80, residual or unreacted molten metal 82 may be removed from the ceramic composite mold 88 (FIG. 8) formed by the process. Ceramic composite mold 88 has a neck portion 90 and a base portion 92 of larger diameter than neck portion 90. A mold cavity 94 is defined within mold 88 and has an opening 94a providing access thereto. Mold cavity 94 is seen to inversely replicate the geometry of expendable pattern body 74.

Figure 9:
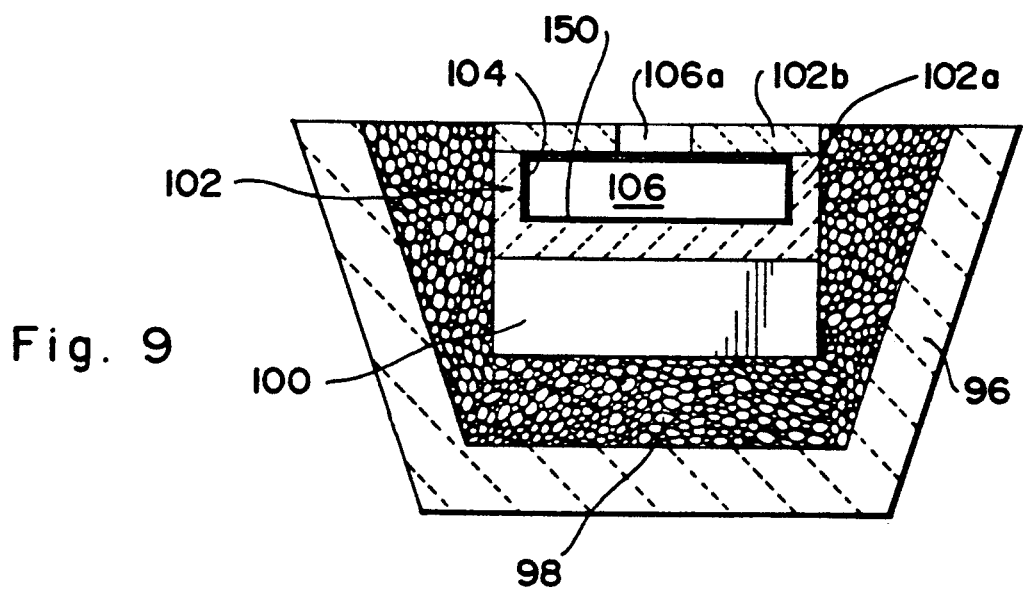
FIG. 9 is a schematic, cross-sectional view in elevation of an assembly of a parent metal and a first filler preform which is usable to make a ceramic composite mold in accordance with another embodiment of the invention.

Referring now to FIG. 9, there is illustrated another embodiment in which an assembly of a refractory vessel 96 has a permeable bed of inert material 98 therein, within which is embedded a solid parent metal body 100 and a preform 102 made of a first filler. Perform 102 is formed as a coherent, shaped article with sufficient green strength to enable it to sustain handling and embedment within the bed of inert material 98. Thus, the first filler particles may be formed into the preform 102 by mixing a suitable binder with particles of first filler and molding or otherwise forming the preform 102 therefrom. Preform 102 may comprise one or a plurality of pieces. For example, the base piece 102a of preform 102 may be generally cup-shaped so that the shaped cavity wall 104 thereof defines a cavity 106 of desired geometry. A cover piece 102b of the preform has an opening 106a formed therein and is positioned atop base piece 102a. Preform 102 is permeable to growth of the oxidation reaction product thereto.

The illustrated assembly of FIG. 9 is heated to a growth temperature within a range above the melting point of parent metal 98 but below the melting point of the oxidation reaction product to be obtained therefrom. As noted above, and as described in detail in some of the above-mentioned copending and Commonly Owned Patent Applications and Patents, the bed 98 of inert material will not sustain growth of oxidation reaction product but the oxidation reaction product will grow through and into the preform 102 of first filler. The operation is carried out for a time sufficient to embed the entirety of preform 102 within the ceramic oxidation reaction product to provide a ceramic composite mold having a mold cavity 106 and an opening 106a providing access thereto. It may also be necessary to provide a barrier means (as discussed above herein) 150 to prevent or inhibit growth of the oxidation reaction product.

As is shown in the following examples directed specifically to aluminum metals, molten aluminum metals spontaneously infiltrate the permeable mass of second filler contained within the impervious mold when the mass is isolated from the ambient atmosphere, i.e. ambient air. Generally, the aluminum employed in the invention may include various alloying elements to provide desired mechanical and physical properties in the metal matrix composite body. For example, copper additives may be included in the aluminum metal to provide a matrix which may be heat-treated to increase hardness and strength.

EXAMPLE 1

Air-impermeable, cylindrical shaped ceramic composite bodies were prepared by the techniques of the above-described commonly owned patent applications. Specifically, three air-permeable cylindrical preforms, each measuring 6 inches high and having a 2 inch outer diameter, were first slipcast using a slip which comprised a mixture of 49.5% by weight of 1000 grit green silicon carbide (supplied by Exolon-ESK Company, Tonawanda, N.Y., under the tradename Carbolon F1000), 19.8% by weight of "100 GL" green silicon carbide (supplied by Superior Graphite Company, Chicago, Ill.) and 30.7% by weight of distilled water. The average particle size of Carbolon F1000 was about 4 microns and that of 100 GL was about 0.8 micron. The slip was prepared by first ball-milling the 100 GL, water, a small amount of "Darvan-7" (supplied by R. T. Vanderbilt and Company, Norwalk, Conn.) and a small amount of ammonium alginate for one hour. The amount of Darvan-7 added was approximately 1.6 grams per 1228 grams of water used and the amount of ammonium alginate used was approximately 4 grams per 1228 grams of water used. After this mixture had been ball-milled for one hour, approximately one-half of the total Carbolon F1000 was added to the mixture and this new mixture was then ball-milled for one-half hour. At this point, the remaining Carbolon F1000 was added and the total mixture was ball-milled for 24 hours. At the end of the 24-hour period, the pH and viscosity were checked and adjusted by slowly adding small amounts of Darvan-7 until the viscosity was approximately 200–500 CPS and the pH was approximately 6–7. When this was achieved, the final mixture was ball-milled for 48 hours before it was used as the slip.

The slipcast cylinders prepared from the slip were dried at 90° C. in an oven and subsequently fired in air at 1100° C. for 10 hours and then cooled to ambient temperature. The heating rate was 200° C./hour while the cooling rate was about 100° C./hour. After firing and cooling, the inside of each cylinder was coated with an interface coating of 500 grit silicon powder (supplied by Atlantic Equipment Engineers, Bergenfield, N.J.). The outside of the cylindrical preforms were coated with a barrier layer comprising by weight a slurry of 35% plaster of paris ("Bondex" supplied by International Inc., Brunswick, Ohio), 15% 500 grit "Minusil" (U.S. Silica Co., Berkeley Spring, W. Va.) and 50% water. The prepared preforms were then heated to 900° C. in a resistance heated furnace, and subsequently 450 grams of a molten aluminum alloy at 900° C. was poured into each preform. The aluminum alloy comprised nominally by weight about 2.5-3.5% Zn, 3-4% Cu, 7.5-9.5% Si, 0.8-1.5% Fe, 0.2-0.3% Mg, and a maximum of about 0.5% Mn, 0.5% Ni, 0.001% Be, 0.01% Ca and 0.35% Sn, the balance being aluminum. Air, diffusing through the permeable barrier and preform, oxidized the molten aluminum alloy to form a polycrystalline oxidation reaction product. This oxidation reaction was continued for 100 hours, during which time the oxidation reaction product of the molten alloy grew into and substantially completely infiltrated each cylindrical preform. At the end of the 100-hour reaction period, the remaining molten alloy was drained to provide hollow ceramic composite cylinders which were impervious to the surrounding atmosphere. These cylinders were closed on one end and open on the other. While still at 900° C., each ceramic composite cylinder was then partially filled with a second filler, to a depth below its top so as to leave a "freeboard" volume of 100 milliliters within each cylinder above the bed of filler. The three respective second fillers used in the three cylinders comprised (1) a 150-gram bed of 24 grit green silicon carbide particles (Crystolon 39) supplied by Norton Company, (2) a 200 gram bed of 24 grit 38 Alundum particles supplied by Norton Company, (3) a 100 gram bed of sand comprised of silicon dioxide of 100 grit size particles supplied by Pennsylvania Foundry Supply and Sand Co., Philadelphia, Pa. About one hundred milliliters (or approximately 220 grams) of nominally pure 1100 aluminum alloy in the molten state was poured onto the top of each bed of second filler in the cylinders. The resultant standing bodies of molten aluminum filled the freeboard space in the cylinders above the filler beds and sealed the only opening of the cylinders throughout the infiltration process, thereby sealing or isolating the beds of second filler from the ambient air. The assemblies were maintained at a temperature of 900° C. and spontaneous infiltration of the molten aluminum metal into the beds of second filler began almost immediately and was usually complete within 20 minutes. After being held 5 hours at 900° C., heating was discontinued and the assemblies were allowed to cool to ambient temperature. Metal matrix composite bodies were obtained comprising the aluminum alloy embedding the different fillers. However, in the system using sand as the second filler, all of the silicon dioxide in the sand reacted with the infiltrated aluminum to form alumina and silicon metal. The silicon metal that was released through this reaction dissolved into the molten aluminum to form an aluminum-silicon alloy. Thus, the final metal matrix composite body obtained through this reaction comprised an aluminum-silicon alloy embedding an alumina filler. The infiltration processes described above were carried out in an ambient air atmosphere without the application of externally applied vacuum, mechanical pressure, wetting agents or other techniques to facilitate infiltration.

Example 1 thus demonstrates the formation of metal matrix composites by spontaneous molten metal infiltration into a filler bed containing entrained air. The infiltration was carried out in an impervious mold or container containing the second filler, said impervious mold or container being hermetically sealed against the atmosphere by the molten metal.

EXAMPLE 2

A 150 milliliter porous clay crucible (DFC crucible #28-1000 manufactured by J. H. Berge Co., South Plainfield, N.J.) was filled with 300 grams of molten aluminum alloy as the parent metal. The aluminum alloy had the same composition as the first aluminum alloy mentioned in Example 1. The assembly consisting of the crucible and molten aluminum alloy was heated in a resistance heated furnace for 3 hours at 900° C. in an air atmosphere in order to grow a polycrystalline oxidation reaction product from the molten aluminum parent metal into the preform, in accordance with the techniques of the above-described commonly owned patent applications and patents. The remaining molten aluminum parent metal was then decanted from the crucible and it was observed that the interior surfaces of the crucible had been infiltrated by a polycrystalline oxidation reaction product to a depth of about 1 to 2 millimeters, thereby providing an air impervious, ceramic-lined crucible. It should be noted that the molten aluminum parent metal reacted both with the air and with the crucible itself during this infiltration. While still at 900° C., 130 grams of green silicon carbide particles of 24 grit size (Crystolon 39, Norton Company) was placed into the 150 milliliter crucible to a depth below the top of the crucible to provide a bed of silicon carbide filler having a freeboard volume of about 60 milliliters within the crucible above the bed. About 130 grams of molten 1100 aluminum (nominally pure) was poured atop the bed of silicon carbide filler to provide a standing body of molten aluminum which sealed the open top of the crucible and isolated the bed of silicon carbide filler from the ambient air. The filled crucible was heated to 900° C. in the same furnace mentioned earlier in the Example, and maintained at 900° C. for a period of 10 hours. During this time the molten aluminum metal infiltrated the entire bed of silicon carbide filler. The assembly was then allowed to cool sufficiently for the aluminum metal to solidify. While still at approximately 500° C., the entire assembly was plunged into water, thereby fracturing the clay crucible including the thin ceramic lining located within the interior surface of the crucible. A metal matrix composite comprising 1100 aluminum alloy embedding the silicon carbide particles was recovered, and the composite had an exterior surface which substantially inversely replicated the shape or geometry of the interior of the original clay crucible.

Example 2 shows that a porous material, such as a clay crucible, may be utilized as a mold when it is rendered air-impermeable by growing a thin layer of oxidation reaction product into the clay crucible, the oxidation reaction product being produced by directed oxidation of a parent metal with air according to the aforesaid commonly owned patent applications and patents. The resultant thin layer of air-impermeable ceramic composite material rendered the otherwise pervious clay crucible impervious to air, thereby enabling the crucible to serve as an impervious enclosure and a mold for the metal matrix composite material.

EXAMPLE 3

The process of Example 2 was repeated twice using two different aluminum alloys and the same type of second filler material. In the first run, an aluminum alloy which nominally comprised by weight about 2.5-3.5% Zn, 3-4% Cu, 7.5-9.5% Si, 0.8-1.5% Fe, 0.2-0.3% Mg, and a maximum of about 0.5% Mn, 0.5% Ni, 0.001% Be, 0.01% Ca and 0.35% Sn, the balance being aluminum, was used with a second filler comprising 90 grit 38 Alundum alumina particles supplied by Norton Company. A metal matrix composite comprising the aluminum alloy embedding the alumina particles was formed. In the second run, a nominally pure 1100 aluminum alloy was used with the 90 grit 38 Alundum second filler. Here also, a metal matrix composite comprising the aluminum alloy embedding the alumina particles was formed. This example shows that is it possible to use alumina filler material of a finer grit size than that used in Example 2 and still obtain the metal matrix composites of the present invention. Further, this example shows that it is possible to use this finer alumina filler material with an 1100 aluminum alloy and still obtain the metal matrix composites of the present invention.

EXAMPLE 4

The process described in Example 1 was repeated with a second filler comprised of 100 grit green silicon carbide particles. The infiltrating aluminum alloy used was 1100 aluminum alloy with about 1% by weight lithium added. A metal matrix composite comprising the aluminum alloy embedding the silicon carbide particles was formed within about 5 minutes from the time the molten aluminum alloy was poured on top of the bed.

The process of the present example was repeated with a second filler consisting of 220 grit green silicon carbide. Here also, a metal matrix composite comprising the aluminum alloy embedding the silicon carbide particles was formed within about 5 minutes from the time the molten aluminum alloy was poured on top of the bed.

This example shows that it is possible to form the metal matrix composites of the present invention with second filler materials of various grit sizes when 1100 aluminum alloy containing about 1% by weight lithium is utilized as the infiltrating metal.

EXAMPLE 5

The objective of the experiments described below was to determine whether coating the filler particles with a sodium-containing compound would facilitate metal matrix composite formation. The process described in Example 1 was used except that the filler particles comprised 220 grit green silicon carbide particles with a $Na_2O$ coating. This coating was formed by first soaking the silicon carbide particles in a sodium hydroxide solution for 3-4 hours. Such soaking formed a sodium hydroxide coating on the particles which, upon removal from the solution and subsequent drying in an oven, became substantially a $Na_2O$ coating. These coated particles were ground with a mortar and pestle to remove any clumps which had formed upon drying. When the coated silicon carbide particles were once again in particulate form, they were then used as the filler material in the process described in Example 1. The infiltrating aluminum alloy used was nominally comprised by weight of 2.5-3.5% Zn, 3-4% Cu, 7.5-9.5% Si, 0.8-1.5% Fe, 0.2-0.3% Mg, and a maximum of about 0.5% Mn, 0.5% Ni, 0.001% Be, 0.01% Ca and 0.35% Sn, the balance being aluminum. A metal matrix composite comprising the aluminum alloy embedding the coated silicon carbide particles was formed.

The experiment described directly above was repeated with uncoated 220 grit green silicon carbide particles. The aluminum alloy did not infiltrate the bed of silicon carbide particles and thus no metal matrix composite was formed. This example shows that it is possible to use $Na_2O$ coatings on filler particles to promote infiltration of an aluminum alloy into even finer particles by using the process of the present invention.

EXAMPLE 6

The process described in Example 1 was performed with a second filler comprising 54 grit silicon carbide and a matrix alloy of 1100 aluminum alloy with about 5% magnesium added. A metal matrix composite comprising the aluminum alloy embedding the silicon carbide particles was formed within 5 minutes of the time the molten aluminum alloy was poured on top of the bed. The procedure described above was repeated using 90 grit silicon carbide particles as the filler material. Once again, a metal matrix composite comprising the aluminum alloy embedding the silicon carbide particles was formed within 5 minutes of the time the molten aluminum alloy was poured on top of the bed.

EXAMPLE 7

The process described in Example 1 was repeated at three lower infiltration temperatures in an attempt to determine the effect of temperature on infiltration time. The infiltration runs were carried out at 800° C., 750° C. and 700° C. and the corresponding infiltration times were 10 minutes, 40 minutes and 90 minutes, respectively. This example shows that the time necessary for complete infiltration of the molten metal into the filler bed increases as the process temperature decreases.

EXAMPLE 8

The process described in Example 1 was repeated with a 90 grit green silicon carbide filler material. This filler material was much finer than the 24 grit silicon carbide filler material used in Example 2. A metal matrix composite comprising 1100 aluminum alloy embedding the silicon carbide particles formed within 5 minutes of the time the molten aluminum alloy was poured on top of the filler bed. The composite had an exterior surface which substantially inversely replicated the shape or geometry of the interior of the original clay crucible. This example demonstrates that it is possible to use finer grades of filler material with nominally pure 1100 aluminum and still obtain the metal matrix composites of the present invention.

EXAMPLE 9

For comparative purposes, this Example duplicates the conditions of the method of the present invention except that it does not provide for hermetic isolation of the filler bed emplaced in the preform.

A. Approximately 100 grams of the 24 grit green silicon carbide particles (Crystolon 39, Norton Company) as used in Example 2 was placed within an air-permeable clay-graphite crucible (designated a "#6" clay-graphite crucible by Ferro Company, Inc., Buffalo, N.Y.) to a depth below the top of the crucible to provide therein a bed of the filler having a freeboard volume of about 90 milliliters within the crucible above the bed. About 190 grams of the first aluminum alloy described in Example 1 was placed atop the bed of silicon carbide filler and the assembly was placed in a resistance-heated furnace and heated in air to 900° C. for 15 hours to melt the aluminum. Sufficient aluminum alloy was used to maintain a standing body of molten aluminum metal atop the bed of filler, thus sealing the top of the crucible so that the filler was sealed from the ambient air by the molten aluminum alloy only at the top of the crucible. After 15 hours at 900° C. the assembly was allowed to cool to solidify the aluminum metal alloy. Upon recovery of the contents from the crucible, it was observed that substantially no infiltration of the molten metal into the bed of silicon carbide filler had occurred.

B. The experiment of Paragraph A was repeated except for using as the filler 50 grams of 500 grit, pre-fired silicon carbide particles (Crystolon 39, Norton Company) placed within a 100 milliliter cylinder of recrystallized alumina (supplied by McDanel Refractory Company, Beaver Falls, Pa.) which was rendered air-permeable by making a crack at the bottom of the cylinder. The assembly was heated to 900° C. in a resistance heated furnace and about 150 grams of molten 1100 aluminum (nominally pure) was then poured over the filler bed to cover the same with a standing body of molten aluminum and thus seal the open top of the crucible. The crucible was held in the furnace for 5 hours at 900° C. with the molten aluminum metal sealing the opening and then the silicon carbide particles and the molten aluminum were stirred with a steel rod. The silicon carbide was not infiltrated or wetted by the molten aluminum metal despite the stirring.

C. The experiment of Paragraph B was repeated in an air-permeable clay graphite crucible, of the type described in Paragraph A, the interior surfaces of which were coated with air-permeable calcium sulfate (plaster of paris, "Bondex" from International, Inc., Brunswick, Ohio) in order to prevent the oxidation reaction product of the molten aluminum with air from growing into the crucible walls, as described in Example 2. The same results as in Paragraph B were obtained, i.e. the silicon carbide filler matrix was not infiltrated or wetted by the molten aluminum metal.

D. The experiment of paragraph B was repeated except that after the 5-hour contact period, 1.5 weight percent of magnesium was alloyed to the molten aluminum. The resulting molten aluminum-magnesium alloy was allowed to stand in contact with the filler for an additional 3 hours at 900° C. Observation showed substantially no infiltration or wetting of the silicon carbide filler by the molten metal.

E. The experiment of Paragraph B was repeated except for using as the filler 50 grams of 24 grit green silicon carbide particles (Crystolon 39, Norton Company). Instead of magnesium, 2 to 3 weight percent silicon was alloyed to the molten aluminum after the initial 5-hour contacting period. The resulting molten aluminum-silicon alloy was allowed to stand in contact with the filler for an additional 3 hours at 900° C. Observation showed substantially no wetting or infiltration of the silicon carbide filler by the molten metal.

EXAMPLE 10

This Example discloses a method of producing camshafts having ceramic matrix composite shells with metal matrix composite cores. Camshaft shell preforms were first prepared by pouring slips into a plaster of paris camshaft mold. The plaster of paris camshaft mold was manufactured by Holland Mold Company, Trenton, N.J. The slip used in this Example had the same composition as the slip described in Example 1, and was prepared by the same method. The average particle size of 100 GL was about 0.8 micron and that of Carbolon F1000 was 4 microns. The slipcast camshaft shell preforms were dried at 90° C. for a minimum time of 4 hours, with 20 hours being a more common drying time. Preforms made by this process were approximately 5 mm thick and their weight varied between 380–480 grams depending on their thickness. These preforms were closed at one end and open at the other end, the open end having the shape of a funnel.

After the drying step was completed, the camshaft preforms were placed with their closed side up in a furnace and fired for 5-20 hours at 1025°-1100° C. The firing temperature most often used was 1025° C. for a period of 20 hours. The furnace containing the preforms was raised from ambient to firing temperature over a 5-hour period, and cooled from firing temperature to ambient over a 5-hour period at the end of the run. During this firing process, each camshaft preform increased approximately 11% in weight. The linear and diametrical expansion of each preform during prefiring was about 3% and the expansion in thickness was approximately 8%.

After firing, the entire interior surface of each preform was coated with a slurry containing silicon metal (500 grit, Atlantic Equipment Engineers, Bergenfield, N.J.). The coating thickness varied between individual camshafts from no coating at all to a maximum coating of approximately 0.1 inch thick. The coating thicknesses were varied in order to determine what the optimum coating thickness was in terms of uniform growth and rate of growth. This optimum coating thickness was determined to be between approximately 0.005 and 0.01 inch. After the preforms were coated with silicon metal slurry on the inside, the preforms were dried and subsequently coated on the outside with a slurry comprising by weight 35% "Bondex" (plaster of paris supplied by International, Inc., Brunswick, Ohio), 15% 500 grit $SiO_2$ ("Minusil", U.S. Silica Company, Berkeley Spring, W. Va.), and 50% distilled water. This second coating was dried in an oven at 90° C. for about 2 hours, and then the preforms were placed in a furnace and heated from ambient to 900° C. over a 5-hour period. Once the furnace temperature reached 900° C., the preforms were held at that temperature for a period of time before molten aluminum alloy was poured into each preform. The period of time between the furnace reaching 900° C. and the addition of the molten aluminum alloy was deliberately varied between preforms. Some of the preforms had the molten aluminum alloy added almost immediately after the furnace temperature reached 900° C. while others had the alloy added later. The maximum period elapsing between the furnace temperature reaching 900° C. and the addition of the molten aluminum alloy was 4 hours.

The amount of molten aluminum alloy added to each preform was 330 grams. This aluminum alloy had the same composition as the first aluminum alloy described in Example 1. The molten aluminum alloy was introduced into the preforms by pouring the molten aluminum alloy into the funnel-shaped open end of the preform while the preform was in the furnace at 900° C. The funnel shape of the open end facilitated the pouring of the molten metal into the preforms and also created a reservoir for the molten metal. Because air penetrates the permeable walls of the preforms, the molten aluminum alloy was oxidized. The growth of oxidation reaction product which resulted from this oxidation of the molten aluminum alloy, infiltrated the walls of each preform, in accordance with the techniques of the above-described commonly owned patent applications and patents. As the growth proceeded, the consumed aluminum alloy was replenished with molten 1100 aluminum alloy at 900° C. The growth process was conducted for 100–150 hours. Although most of the growth occurred in the first 30 hours, the extra reaction time produced a more uniform product in terms of growth phase.

Figure 10:
FIG. 10 is a photograph of a camshaft made in accordance with Example 10.

After the oxidation reaction product had fully infiltrated the walls of each preform creating ceramic composite camshaft shells, the molten aluminum alloy was poured out of the shells while the shells were still at 900° C. The ceramic composite camshaft shells (still at 900° C.) were then filled with 24 grit green SiC (Crystolon 39, Norton Company) as the second filler and capped with a metal matrix alloy at 900° C. A number of metal matrix alloys have been used. These include aluminum alloy 1100; the first aluminum alloy described in Example 1; an aluminum alloy comprising 1100 aluminum alloy with about 0.25–3% Li added; an aluminum alloy comprising 1100 aluminum alloy with about 0.5–5% Mg added; an aluminum alloy comprising the first aluminum alloy described in Example 1 with about 0.25–3% Li added; and the first aluminum alloy described in Example 1 with about 0.5–5% Mg added. Once the SiC bed in each preform is capped with the matrix alloy, infiltration of the matrix alloy into the bed occurred almost immediately and was completed in about 20 minutes. During this 20-minute period, additional matrix alloy was added as needed to each preform so that each bed was always capped with matrix alloy. After the infiltration period was completed the camshafts were cooled to ambient over a 12–15 hour period, cleaned, cut and ground to specification. The grown camshafts were cleaned by sand-blasting and cut to an appropriate length using a diamond abrasive cutoff wheel. The grinding of cylindrical surfaces was carried out using resinoid-bonded 100 grit diamond wheels. The cam grinding was carried out using resinoid-bonded 220 grit diamond wheels. The feed rate was about 0.002–0.003 inch for cutting and about 0.0005 to 0.0008 inch for grinding. A camshaft made by this process is shown in FIG. 10.

Example 10 shows that a device having a complicated and intricate geometry can be prepared so that is has a ceramic matrix composite shell and a metal matrix composite core. The ceramic matrix composite shell is prepared first by infiltrating a shaped preform, comprised of a first filler material, with the oxidation reaction product of an aluminum alloy with air. Then the metal matrix composite core is prepared by the spontaneous infiltration of molten aluminum into a hermetically sealed bed of second filler containing entrained air, the second filler being located within the hollow interior of the ceramic matrix composite shell. This procedure yields a final product having the combined properties of a ceramic matrix composite and a metal matrix composite.

The methods of this invention are applicable to a wide variety of second fillers, especially ceramic fillers, and the choice of second filler will depend on such factors as the particular aluminum or magnesium metal used, the process conditions employed, the type and size of the second filler, and the properties sought for the final metal matrix composite product. Preferably, the second filler, i.e. the reinforcing or strengthening agent for the metal matrix composite, is non-reactive with the molten aluminum metal or magnesium metal under the process conditions. Suitable second filler materials include, for example, (a) oxides, e.g. alumina, magnesia, titania, zirconia and hafnia; (b) carbides, e.g. silicon carbide and titanium carbide; (c) borides, e.g. titanium diboride, aluminum dodecaboride, and (d) nitrides, e.g. aluminum nitride, silicon nitride, and zirconium nitride. If there is a tendency for the second filler material to react with the molten aluminum or magnesium, this might be accommodated by minimizing the infiltration time and temperature or by providing a non-reactive coating on the filler. The second filler material may comprise a material, such as carbon or other non-ceramic material, bearing a ceramic coating to protect the substrate from attack or degradation. Ceramics which are particularly well suited for use in the method of the present invention, include alumina and silicon carbide in the form of particles, platelets, whiskers and fibers. The fibers can be discontinuous filament, such as multifilament tows. Further, the second filler may comprise either a homogeneous or heterogeneous mass or preform.

Silicon carbide tends to react with pure molten aluminum to form aluminum carbide, and if silicon carbide is used as the second filler, it is desirable to prevent or minimize this reaction because aluminum carbide is susceptible to attack by moisture, which potentially weakens the metal matrix composite body. Consequently, to minimize or prevent this reaction, the silicon carbide can be prefired in air to form a reactive silica coating thereon, or the aluminum can be alloyed with silicon, or both. In either case, the effect is to increase the silicon content in the alloy to eliminate the aluminum carbide formation. Similar methods can be used to prevent undesirable reactions with other second filler materials.

The size and shape of the second filler can be any size and shape which may be required to achieve the properties desired in the metal matrix composite product or body. Thus, the second filler may be in the form of particles, whiskers, platelets or fibers since infiltration of the second filler by the molten aluminum metal is not restricted by the shape of the second filler mass. Other shapes such as spheres, tubules, pellets, refractory fiber cloth, and the like, may be employed. In addition, the size of the second filler mass does not limit infiltration, although a higher temperature or longer time period may be needed for complete infiltration of a mass of smaller particles than for larger particles. The second filler can be either at its pour density or compressed to a modest density.

In comparison with conventional metal matrix composite technology, the present invention obviates the need for special gas atmospheres and for high pressures, high temperatures, externally applied vacuum, or mechanical pressure to force the molten aluminum or magnesium into the second filler. The present invention permits operating in ambient air atmospheres and enables the production of aluminum metal matrix composites or magnesium metal matrix composites with a wide variety of second fillers, a range of second filler loadings, and with low porosity.

EXAMPLE 11

This example illustrates a variation of the process to produce a shaped metal matrix part. In this case, a foam pattern about 4"×2"×1" was coated with a Leecote ® (LX-60, Acme Resin Corp., Madison, Ohio) slurry by dipping the pattern into a beaker containing Leecote ®. The pattern was subsequently withdrawn with a thin coat of Leecote ® adhering to the exterior surfaces thereof. The pattern, while still tacky, was sprinkled with #90 grit 38 Alundum which adhered to the Leecote ® coating. The pattern having the Leecote ® coating was dried and the process of dip-coating with Leecote ® and sprinkling #90 alundum was repeated several times to obtain an approximately ⅛" thick Leecote ®/#90 grit 38 Alundum coating on the foam pattern. The coated pattern was then dried and heated to about 900° C. over a 4-hour period. The foam pattern volatilizes during the heating process, thus leaving behind a cavity which inversely replicates the outer shape of the foam pattern.

After substantially complete volatilization of the foam, a molten parent metal alloy nominally comprised by weight of about 2.5-3.5% Zn, 3-4% Cu, 7.5-9.5% Si, 0.8-1.5% Fe, 0.2-0.3% Mg, and a maxiumum of about 0.5% Mn, 0.5% Ni, 0.01% Be, 0.01 Ca, and 0.35% Sn, the balance being aluminum was poured into the resulting cavity and subjected to oxidation for 24 hours to obtain an impermeable mold for the formation of a metal matrix composite body. Thus, the mold was formed by the techniques of the above-described commonly owned U.S. applications and patents. Residual parent metal alloy i.e., parent metal alloy which was not converted into the oxidation reaction product was, subsequently drained from the formed mold and the mold was filled with approximately 166 grams of 24 grit silicon carbide (Crystolon 39, Norton Company) and capped with 100 grams of an aluminum alloy which nominally comprised by weight about 2.5-3.5% Zn, 3-4% Cu, 7.5-9.5% Si, 0.8-1.5% Fe, 0.2-0.3% Mg, and a maxiumum of about 0.5% Mn, 0.5% Ni, 0.01% Be, 0.01 Ca, and 0.35% Sn, the balance being aluminum. This aluminum alloy infiltrated the bedding after about 5 minutes yielding a metal matrix composite contained within the impermeable mold. The mold and its contents were cooled below 550° C. and then quenched in water to fracture the mold due to thermal stresses induced by thermal shock. The resulting shaped metal matrix composite had substantially the same shape as the starting foam pattern. Thus, this example illustrates a method of producing complex-shaped metal matrix components. It is expected that instead of a foam pattern, or a wax pattern, other patterns could also be used to yield substantially the same result.

EXAMPLE 12

Example 11 was repeated except that the filler material used was #500 Alundum 38, the container was a welded 304 stainless steel cylinder (2"×2"×4") and the matrix alloy comprised, nominally, 12.5%-Si, 6%—Mg, 5%—Zn and the remainder being Al. In this case, the infiltration occurred for about 2 hours and the metal was subsequently cooled. It was observed that the alundum bedding was infiltrated by the aluminum alloy.

What is claimed is:

1. A method of producing a metal matrix composite, comprising:
    (a) forming a substantially impervious mold by the steps comprising:
        (i) providing a permeable preform having a cavity and comprised of a first filler material comprising a material selected from the group consisting of alumina and silicon carbide;
        (ii) contacting a molten parent metal comprising aluminum with said preform and with an oxidant comprising air to react molten parent metal with said oxidant to form an oxidation reaction product within a temperature range extending from a temperature above the melting point of said parent metal to a temperature below the melting point of said oxidation reaction product;
        (iii) maintaining at least a portion of said oxidation reaction product in contact with and extending between said molten parent metal and said oxidant to progressively draw molten parent metal through the oxidation reaction product towards the oxidant and into said preform so that the oxidation reaction product continues to form within said preform at the interface between said oxidant and previously formed oxidation reaction product;
        (iv) continuing said oxidation reaction within said temperature range to embed at least a portion of said preform within said oxidation reaction product by growth of the oxidation reaction product to thereby provide an impervious mold with said cavity; and
        (v) removing at least a portion of excess metal from said cavity which has not reacted with said oxidant to form oxidation reaction product;
    (b) emplacing a permeable mass of a second filler material comprising silicon carbide within said cavity of said impervious mold, and
    (c) contacting said mass of second filler material with at least one molten metal selected from the group consisting of aluminum and magnesium;
    (d) hermetically sealing the mold contents for a period of time sufficient to spontaneously infiltrate said mass of second filler with said at least one molten metal; and
    (e) upon completion of step (d), solidifying said at least one molten metal to provide said metal matrix composite.

2. The method of claim 1, further comprising maintaining at least a portion of said metal matrix composite in contact with said impervious mold in a manner sufficient to integrally bond said impervious mold to said at least a portion.

3. The method of claim 1, wherein said second filler material is present in a quantity ranging from about 10 through about 65 volume percent.

4. The method of claim 1, wherein said second filler material is present in a quantity ranging from about 45 through about 65 volume percent.

5. The method of claim 1, wherein at least one of said first and second filler material comprises at least one material selected from the group consisting of fibers, particulates, whiskers, spheres, and pellets.

6. The method of claim 1, wherein an excess quantity of said molten metal is provided, and further comprising replacing at least a portion of said excess metal with another material.

7. The method of claim 6, wherein said another material comprises at least one material selected from the group consisting of another metal and another filler material.

8. The method of claim 1, wherein contacting said second filler with at least one molten metal comprises immersing at least a portion of said second filler into said molten metal.

* * * * *